(12) United States Patent
Nielsen

(10) Patent No.: US 8,276,024 B2
(45) Date of Patent: Sep. 25, 2012

(54) METHOD AND SYSTEM FOR ERROR CORRECTION OF A STORAGE MEDIA

(75) Inventor: Sven Nielsen, San Diego, CA (US)

(73) Assignee: Sony Computer Entertainment America LLC, Foster City, CA (US)

(*) Notice: Subject to any disclaimer, the term of this patent is extended or adjusted under 35 U.S.C. 154(b) by 329 days.

(21) Appl. No.: 12/079,186

(22) Filed: Mar. 25, 2008

(65) Prior Publication Data

US 2009/0249000 A1    Oct. 1, 2009

(51) Int. Cl.
G06F 11/00 (2006.01)

(52) U.S. Cl. .......................................... 714/54; 714/6.32

(58) Field of Classification Search .................... 714/54, 714/6.32
See application file for complete search history.

(56) References Cited

U.S. PATENT DOCUMENTS

| | | | |
|---|---|---|---|
| 7,496,608 B2* | 2/2009 | Wilbrink et al. | 1/1 |
| 7,577,806 B2* | 8/2009 | Rowan et al. | 711/162 |
| 2004/0073846 A1* | 4/2004 | Nakanishi et al. | 714/42 |
| 2004/0210792 A1 | 10/2004 | Foster et al. | |
| 2005/0076264 A1 | 4/2005 | Rowan et al. | |
| 2005/0262147 A1 | 11/2005 | Lee | |
| 2007/0241176 A1 | 10/2007 | Epstein et al. | |
| 2008/0285413 A1* | 11/2008 | Milster et al. | 369/59.23 |
| 2009/0287956 A1* | 11/2009 | Flynn et al. | 714/6 |

FOREIGN PATENT DOCUMENTS

| | | |
|---|---|---|
| JP | 2002049518 A | 2/2002 |
| JP | 2003529118 A | 9/2003 |
| JP | 2005228004 A | 8/2005 |
| JP | 2008084423 A | 4/2008 |
| WO | 2006021913 | 3/2006 |

OTHER PUBLICATIONS

International Search Report, PCT/US09/01834, dated May 1, 2009.
Search Report, European Patent Application No. 09725798.4, dated Mar. 15, 2012.
English translation of Japanese Office Action Application No. 2010-501800 dated Apr. 17, 2012.

* cited by examiner

*Primary Examiner* — Bryce Bonzo
(74) *Attorney, Agent, or Firm* — Lerner, David, Littenberg, Krumholz & Mentlik, LLP

(57) ABSTRACT

A data file on a storage media is processed during playback or execution to identify unreadable data. Replacement data corresponding to the unreadable data is obtained over a communications network, and the replacement data is used to playback or execute the data file as if the data file does not contain any unreadable data.

9 Claims, 4 Drawing Sheets

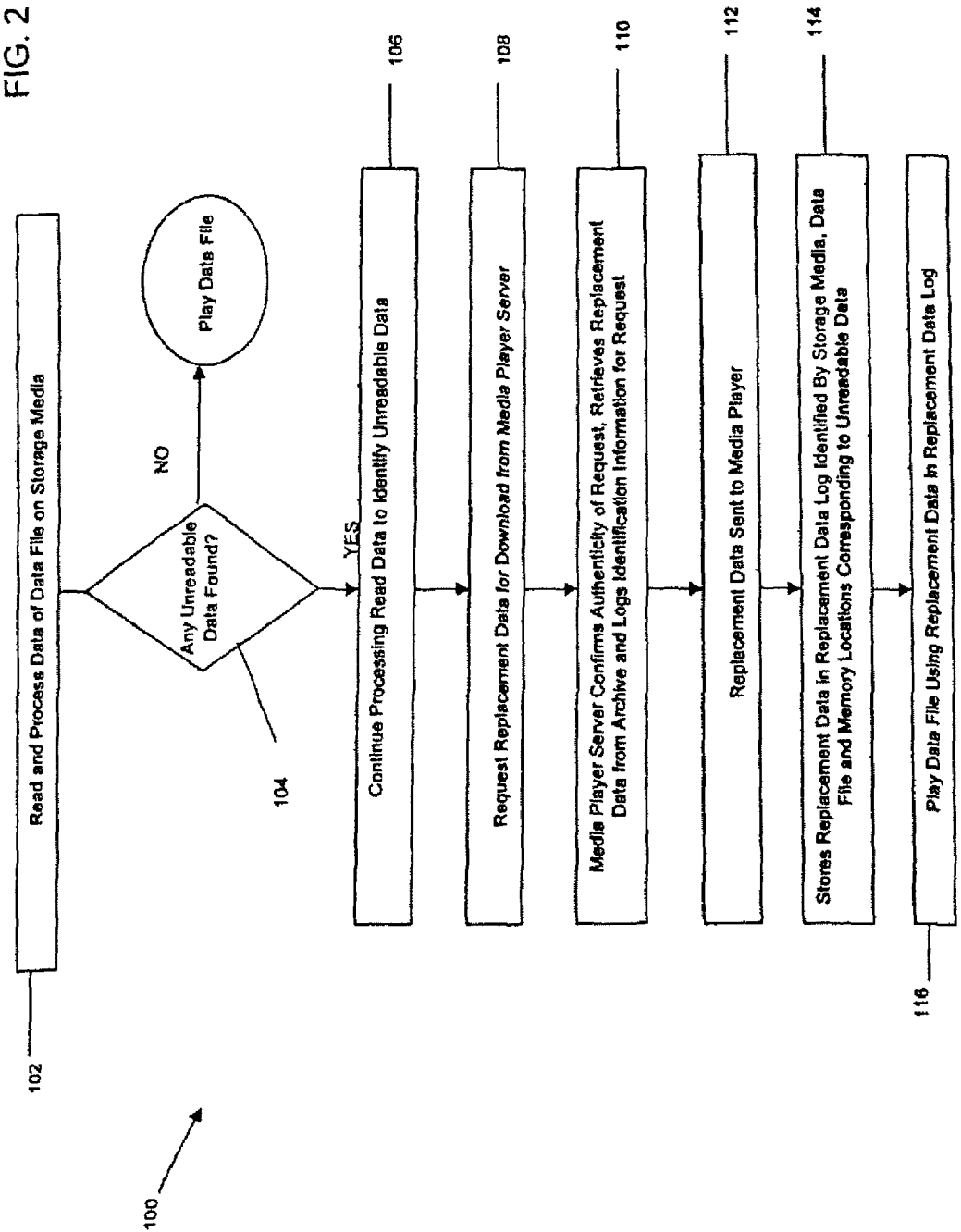

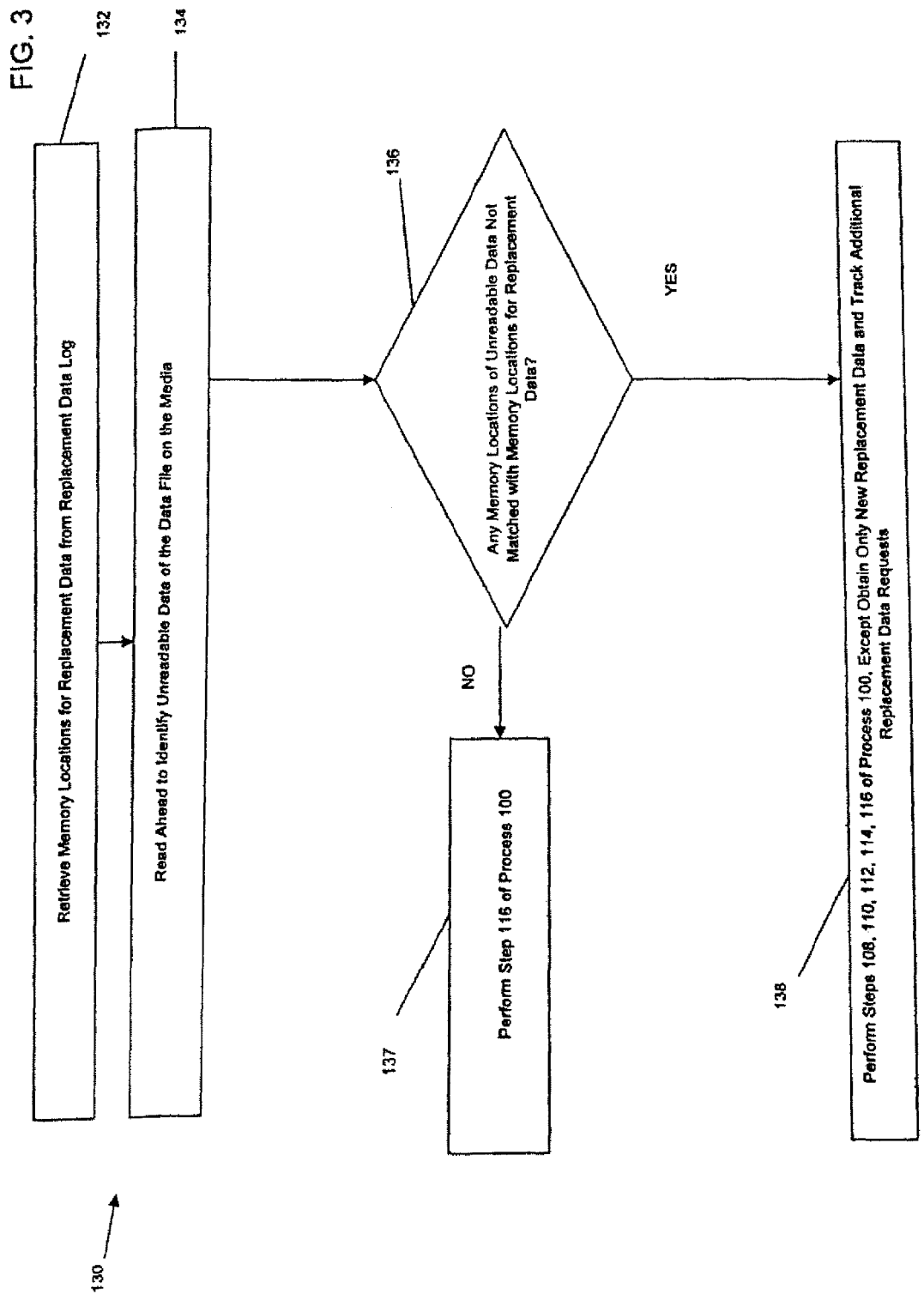

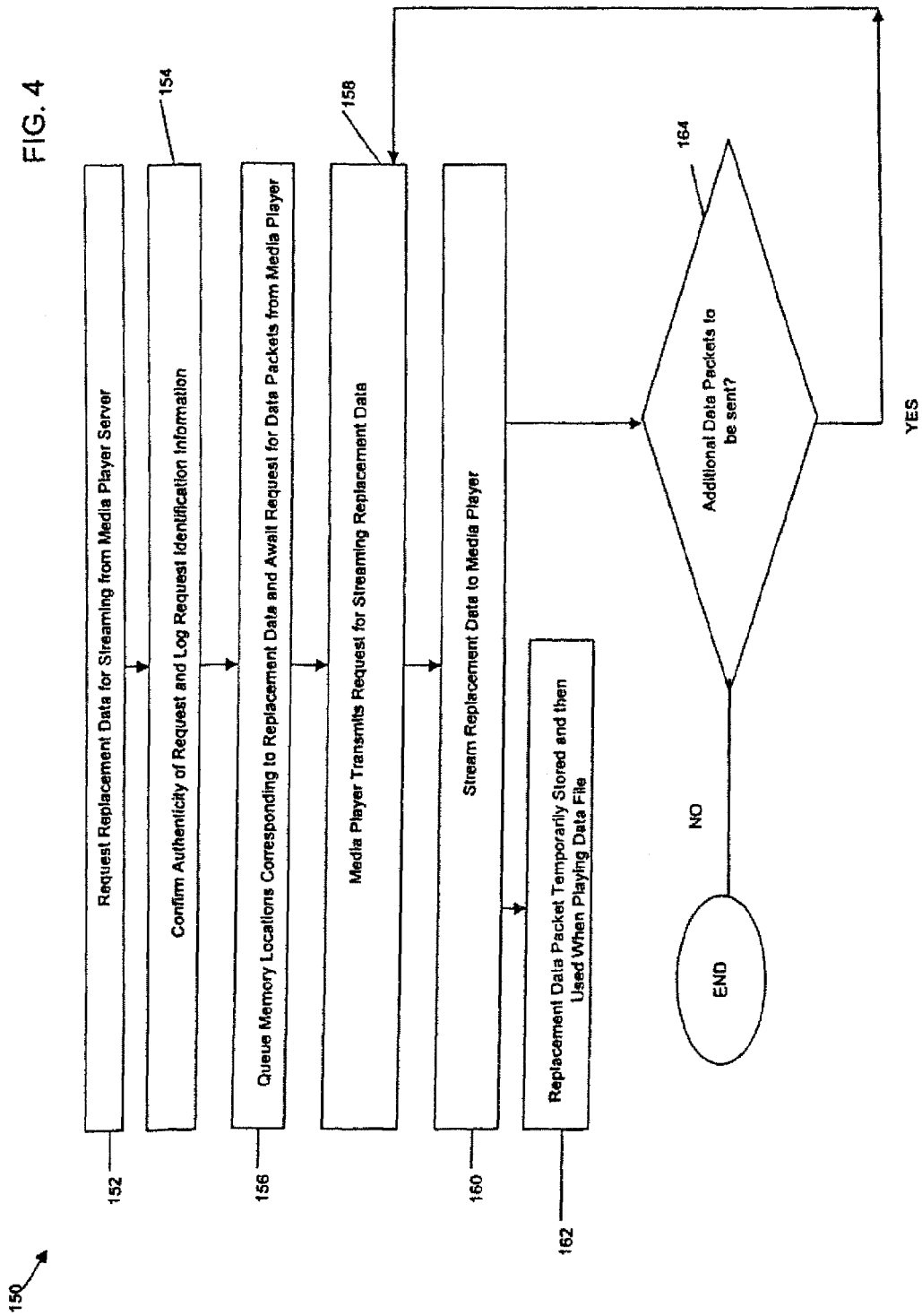

METHOD AND SYSTEM FOR ERROR CORRECTION OF A STORAGE MEDIA

BACKGROUND OF THE INVENTION

Electronic entertainment devices, such as DVD players, CD players, DVRs, gaming consoles, etc., provide for playback of multimedia content, such as movies, music and games, by reading and processing data of a data file, typically a multimedia data file, stored on a storage media. The storage media may be permanently contained within the entertainment device, such as in the form of a hard disk. Alternatively, the storage media may be portable, such as in the form of a DVD, CD, memory card, flash device, USB memory device, etc., inserted into an external drive of the entertainment device.

Some electronic entertainment devices include communications capabilities, such that a multimedia data file may be downloaded and then stored on an internal or a portable storage media for subsequent playback, or streamed for immediate playback. In addition, some sophisticated electronic entertainment devices, such as typically found in a home theater entertainment system, can be coupled to another entertainment device, such as a video IPOD, and provide for playback of a multimedia data file stored on a storage media within the coupled entertainment device on, for example, a television that is a part of the home theater system.

Occasionally, one or more portions of a multimedia data file, which has been, or was intended to be, stored on a storage media, cannot be read without error or at all by an entertainment device, or actually is missing from the storage media. For ease of reference, the term "unreadable data" as used in this application constitutes: any portion of a data file stored on a storage media that cannot be read from the storage media, for example, due to damage to the storage media; any portion of a data file intended to be stored on a storage media but which was in fact not actually stored on the storage media, for example, due to a manufacturing defect in the storage media, or errors occurring during download of data for writing or the writing of data on the storage media; or any portion of a data file intended to be stored on a storage media but which was stored in a corrupted or incomplete form on the media, such that the portion, although being readable, cannot be corrected by error correction techniques available on the entertainment device.

In circumstances where the multimedia data file on a storage media includes unreadable data, the entertainment device cannot playback the content of the multimedia data file at all, or playback of the file stops or becomes disrupted when the portion of the storage media corresponding to the unreadable data of the file is encountered during processing of the data read from the storage media. For example, a portable storage media, such as a CD, DVD or gaming disc, may become scratched or otherwise damaged, or alternatively contain a manufacturing defect, such that an optical drive of an entertainment device, such as a CD player, DVD player or gaming console, cannot read any, or can read only portions, of the data of the data file corresponding to locations on the disc containing the scratch or defect. Depending on the entertainment device and its error correction capabilities, and also the content contained in the multimedia file, the audio data file on a CD, such as song, or the audio and video data file on a DVD, such as a movie, containing the scratch or defect may not at all be playable, or the playback of the song or movie may skip over the portion of the data file corresponding to the unreadable data, such that playback continues at the next portion of the data file that is not unreadable. When playback of a multimedia data file from a storage media is in any way not error free, and an individual determines that the cause is the storage media and not the entertainment device, the individual may consider that the storage media, such as a CD, DVD or gaming disc, is no longer useful for pleasing playback.

Currently, if an individual finds that a data file on a storage media includes unreadable data, the individual must obtain a new copy of the entire data file, such as by purchasing a new or obtaining a replacement portable storage media e.g., CD, DVD, or downloading the entire data file from a multimedia server, e.g., ITUNES, over a communications network, such as the Internet, to provide that the individual can enjoy playback of the entire content contained in the data file without error or interruption. Thus, the entire data file must be replaced to provide for playback of the content in the intended manner, even if the unreadable data on the storage media actually constitutes only a very small portion of the multimedia data file.

Therefore, there exists a need for method and system for easily obtaining replacement data corresponding to unreadable data of a data file on a storage media and using the replacement data during playback or execution of the data file.

SUMMARY OF THE INVENTION

In accordance with the present invention, a device for execution or playback of a data file ("playback device") which includes network communications capabilities, such as a multimedia player for reading data from a data file stored on a storage media and playing content contained in the data file, determines whether a data file on a storage media includes unreadable data, identifies memory location(s) in the file corresponding to the unreadable data and then transmits to a data file server, such as a media player server, over a communications network, a request for replacement data corresponding to the identified memory location(s) of the data file. The server retrieves the requested replacement data from an archival database, and then transmits the replacement data to the playback device. The playback device uses the replacement data while playing or executing the data file, such that playback or execution of the data file occurs as if the data file stored on the storage media does not contain the unreadable data.

In one embodiment, the playback device stores in its memory replacement data for a data file with information identifying the storage media and the data file which necessitated a request for the replacement data, and uses the stored replacement data when the data file of the storage media is subsequently played at the playback device.

In a further embodiment, the server streams replacement data to the playback device for use by the playback device during playback of the data file from the storage media.

In another embodiment, the server stores in memory correction data representative of the memory locations corresponding to replacement data requested for a data file, the identity of the data file and the identity of a storage media containing the data file, such that the correction data may be used for identifying potential problems with the manufacture of storage media, the writing of a data file on storage media and a master data file used for writing a data file on storage media.

BRIEF DESCRIPTION OF THE DRAWINGS

Other objects and advantages of the present invention will be apparent from the following detailed description of the presently preferred embodiments, which description should be considered in conjunction with the accompanying drawings in which:

FIG. 2 is a flow diagram in accordance with an aspect of the invention.

FIG. 3 is a flow diagram in accordance with an aspect of the invention.

FIG. 4 is a flow diagram in accordance with an aspect of the invention.

DETAILED DESCRIPTION

Figure 1:
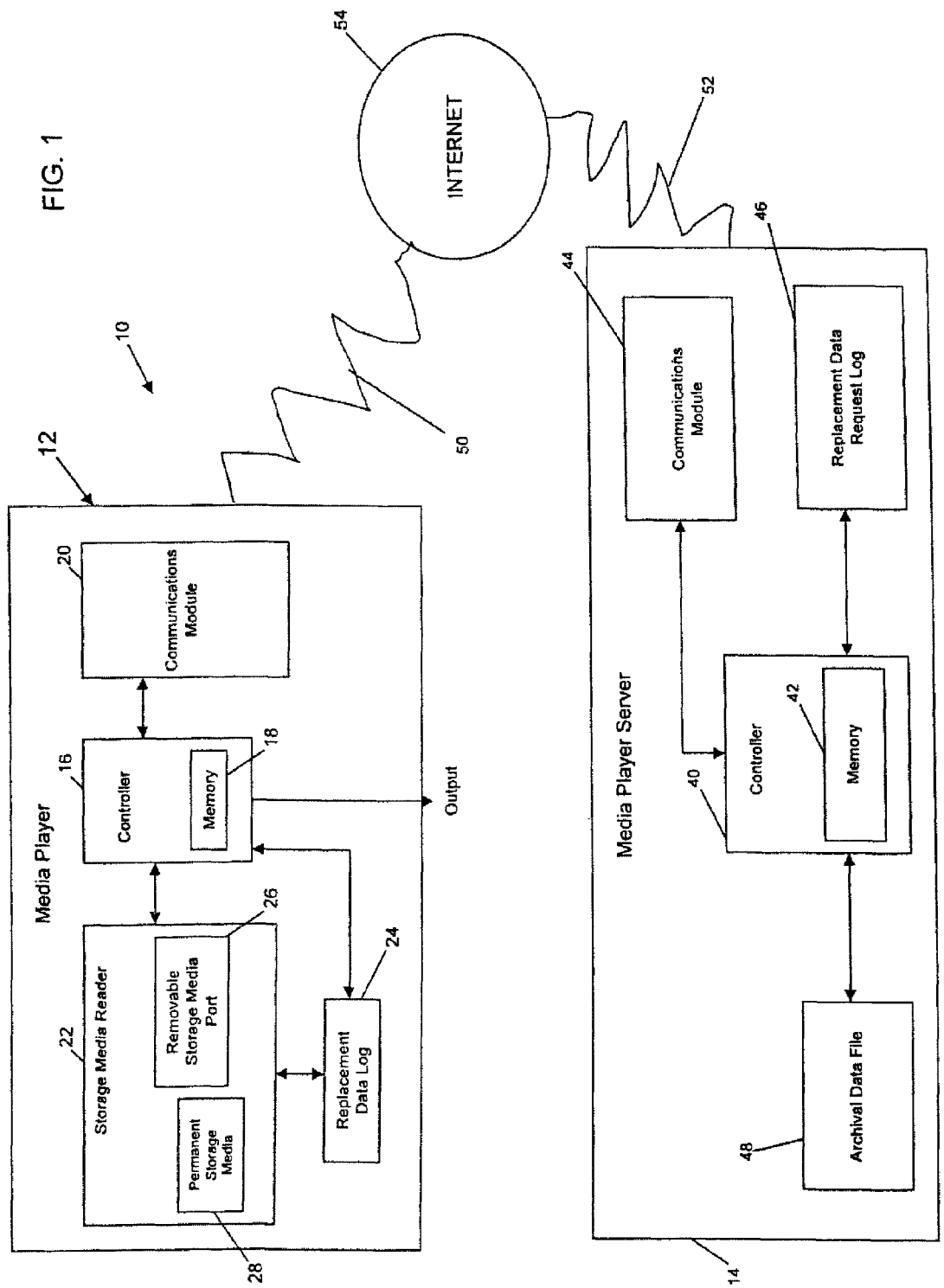
FIG. 1 is a block diagram of an exemplary system in accordance with an aspect the invention.

The present invention is illustrated below in connection with a multimedia player including an optical reader for reading an optically readable multimedia data file stored on an optical storage media, where the player has the capability of communicating with a multimedia player server over a communications network for obtaining from the server replacement data corresponding to unreadable data of the data file and uses the replacement data during playback of the multimedia content of the data file to provide that playback occurs as if the storage media does not contain the unreadable data. It is to be understood, however, that the present invention can be implemented in connection with any device capable of executing or playing a discrete data file read from a storage media, obtaining replacement data over a communications network corresponding to unreadable data of the data file and using the replacement data when executing or playing the data file.

FIG. 1 shows in block diagram form an exemplary embodiment of a system 10 for obtaining replacement data corresponding to unreadable data of a data file stored in a storage media using a communications network, and for playing content contained in the data file using the replacement data, in accordance with the present invention. Referring to FIG. 1, the system 10 includes a media player 12 for playing content of a multimedia data file stored on a storage media, and a media player server 14 for transmitting to the media player 12, over a communications network, replacement data corresponding to unreadable data of the data file on the storage media.

The player 12 includes a controller 16 containing a memory 18, and the controller 16 is coupled to a communications module 20, a storage media reader 22 and an optional replacement data log module 24. The reader 22 is coupled to the log module 24, and includes a removable storage media port 26 and an optional permanent storage media 26. The media player server 14 includes a controller 40 containing a memory 42, and the controller 40 is coupled to a communications module 44, a replacement data request log module 46 and an archival data file module 48.

It is to be understood that each of the modules in the media player 12 and the media player server 14 which is described below as performing data processing operations is a software module or, alternatively, a hardware module or a combined hardware/software module. In addition, each of the modules in the player 12 and the server 14 suitably contains a memory storage area, such as RAM, for storage of data and instructions for performing processing operations, and a processor for executing data processing instructions and processing data, in accordance with the present invention. Alternatively, instructions for performing processing operations may be stored in hardware in one or more of the modules in the player 12 and the server 14.

The media player 12, for example, is a DVD player, CD player, game console, personal computer, DVR, hand held computing device, cellular telephone, PDA, etc.

The controller 16 is a conventional microprocessor for performing the steps of processes stored as instructions in the memory 18. The processes control the processing of data within the controller 16, and also the exchange of data between the controller 16 and each of the reader 22, the log module 24 and the communications module 20, for implementing the features of the present invention. The data processing operations include processing a multimedia data file for generating audio and video data for output to, for example, a home theater system, as conventional in the art.

Each of the communications modules 20, 44 is a conventional transceiver having at least one of wired and wireless communications capabilities. The modules 20, 44 suitably provide for transmission of data signals over, and reception of data signals from, a wired or wireless communication link 50, 52, which couple the player 12 and the server 14, respectively, to a communications network 54, such as the Internet. The modules 20, 44 establish IP addresses for the player 12 and server 14, respectively, to provide that data may be exchanged between the former and latter over the Internet 54.

The storage media reader 22 is a conventional device for reading data from a storage media containing, for example, optically, holographically, magnetically, etc., stored data. The reader 22, for example, is an optical drive and optical data reader system, a magnetic card reader, a flash media reader or like reader known in the art capable of reading, for example, a DVD, a CD, a magnetic memory card, a flash memory or like memory device known in the art.

The removable storage media port 26 is a conventional device for receiving a portable storage media, such as a disc containing optically readable data, a memory card containing magnetically encoded data, a flash memory device or like media known in the art.

The permanent storage media 28 is a conventional memory device, such an optical hard disc, a chip memory, etc., or like device known in the art.

The log module 24 stores replacement data identified by the data file for which replacement data was requested, the memory location(s) in the data file corresponding to the replacement data and the identity of the storage media containing the data file.

In addition, the reader module 22 includes conventional means for facilitating transfer of replacement data from the log module 24 to the reader module 22, as needed, during playback of a data file, as described in further detail below.

The controller 40 is a conventional microprocessor for performing the steps of processes stored as instructions in the memory 42. The processes control the processing of data within the controller 40, and also the exchange of data between the controller 40 and the archival module 48, the request log module 46 and the communication module 44, for implementing the features of the present invention.

The archival data file module 48 includes a database containing data files, such as multimedia data files including the content of movies, music, games, music, etc., which have been confirmed to be complete and, thus, can be used to obtain replacement data corresponding to unreadable data of a data file on a storage media being played on the player 12. As conventional in the art, the content information for each of the data files in the module 48 is stored in data packets, and each of the data packets includes a header which corresponds to a memory location in the data file.

The replacement log module 48 includes a database containing the identity of a storage media containing a data file for which a request for replacement data was received at the server 14, the identity of the data file for the request and the memory locations within the data file corresponding to the requested replacement data.

In accordance with one aspect of the present invention, when the media player 12 determines that a data file stored on a storage media being read by the reader 22 includes unreadable data, the media player 12 requests replacement data corresponding to the unreadable data from the server 14 and then plays the data file using the replacement data transmitted from the server 14, such that playback of the content corresponding to the data file occurs as if the data file does not include unreadable data.

FIG. 2 shows an exemplary process 100 for determining whether a data file on a storage media includes unreadable data, identifying memory locations corresponding to the unreadable data, requesting replacement data for the identified memory locations of the data file over a communications network and then using the replacement data when playing the content of the data file. For purposes of illustrating the invention, the process 100 is described in connection with operations performed by components of the media player 12 and the server 14 of the system 10, as shown in FIG. 1, and where the player 12 includes the functionalities of a conventional DVD player for playing a conventional, optically readable DVD containing a movie whose content is stored on the DVD as a multimedia data file. In addition, as discussed below, the media player 12 performs the process 100 the initial time that the media player 12 reads a particular data file on a particular storage media, and the media player 12 performs a process 200, which is discussed below in the text accompanying the description of FIG. 3, each subsequent time that the media player 12 plays the same, previously played data file from the particular storage media.

Referring to FIG. 2, after a DVD storage media is inserted into the port 26, in step 102 the storage reader 22 of the player 12 begins to optically read data from a multimedia data file, for example, a movie, stored on the DVD. As conventional in the art, the movie content is stored on the DVD in data packets containing audio and video information, and the data packets of the data file include sequentially numbered headers identifying the memory location of each of the data packets in the data file. Further in step 102, the reader 22 processes the data read from the data file in the order the data packets are read from the DVD, and determines whether the data file contains any unreadable data. The unreadable data, for example, corresponds to a data packet that does not contain multimedia content data, a data packet whose multimedia content data includes errors not correctable by error correction processes contained in, for example, the memory 18 of the controller 16, or a data packet of the data file completely missing from the read data. The reader 22 continues processing the read data, in the order the data is read from the DVD, until any unreadable data is initially found. At this point, the reader 22 stops further processing for determining that the data file contains unreadable data, and identifies the memory location of the data packet corresponding to the unreadable data. In addition, in step 102, the reader 22, to the extent possible, in other words, if such information is contained and also readable from the DVD, determines the disc identifier information for the DVD and also the identifier of the data file. This disc and data file identification information usually is included on the DVD with or within the data file, and provide that the authenticity of the DVD can be confirmed. The process 100 proceeds to step 104 after the reader 22 stops processing the read data.

Following step 102, in step 104, the reader 22 determines whether any unreadable data was found in step 102. If no, the reader 22 has read and processed the entire data file without finding any unreadable data, such that the player 12 proceeds to playback the movie as conventional for DVD players. If yes, the data file includes unreadable data, so the process 100 proceeds to step 106.

In step 106, the reader 22 continues processing, to the extent possible, the data read from the data file of the DVD and stores in its memory the memory locations of each data packet determined to constitute unreadable data. For example, if the reader 22 determines that a sequence of data packets is missing from the data file, the reader 22 identifies the unreadable data as the data packets spanning from the memory location following the last data packet that does not constitute unreadable data to the memory location preceding the location of the next data packet that does not constitute unreadable data.

Further in step 106, after the reader 22 completes processing the entirety of the data read from the data file, the reader 22 transmits a complete processing data signal to the controller 16. The complete signal indicates that processing for identifying unreadable data has been completed, and also includes the DVD identification information, information identifying the data file (movie) read from the DVD and the memory locations of the data packets corresponding to the unreadable data of the data file.

Then in step 108, the controller 16 generates and transmits to the communications module 20 a request replacement data control signal. The request control signal includes data representative of the memory locations of the respective data packets of the data file corresponding to the unreadable data, the identity of the data file and the DVD identification information ("request data"). Upon receipt of the request control signal, the module 20, in turn, generates and transmits over the link 50 a request for replacement data signal addressed to the IP address of the server 14 and including the request data.

In step 110, the communication module 44 receives, from the communication link 52, the request signal transmitted by the module 20, which was routed from the link 50, to the network 54, the link 52 and ultimately to the server 14, based on its IP address. The module 44 extracts the request data from the request signal and then transmits the request data to the controller 40. The controller 40 processes the request data to authenticate the DVD being played at the player 12, in other words, ensure that the DVD is not an unauthorized copy. Assuming the DVD is authenticated, the controller 40 transmits the data file (movie) identifier and memory location information contained in the request data to the archival module 48 and all of the request data to the replacement log module 46.

Further in step 110, the log module 46, based on the data transmitted from the controller 40, creates a correction record of the identity of the DVD, the data file on the DVD for which replacement data has been requested and the memory location information for the unreadable data of the data file. The records in the module 46 may be utilized, for examples to identify potential problems in the manufacture of certain types of media, such as DVDs, problems with the transfer of specific data files to specific types of media and problems with the master data file used to create authorized copies of a data file on storage media.

Referring again to FIG. 2, in step 112 the archival module 48 locates the identified data file in its database, and then generates replacement data. The replacement data includes a copy of each of the data packets of the data file having a memory location included in the request data. The archival module 48 then forwards the replacement data to the controller 40, which then transmits a control signal including the replacement data to the module 44. Following receipt of such control signal, the module 44 generates and transmits over the link 52 a replacement data signal including the replacement data and addressed to the IP address of the player 12.

In step 114, the module 20, following receipt of the replacement data signal transmitted by the module 44, extracts the replacement data from the replacement data signal and then forwards to the controller 16 the replacement data. The controller 16, in turn, routes the replacement data with the associated storage media (DVD) and data file identifier information to the log module 24. The log module 24 stores in its memory the replacement data identified by respective memory location, and also identified by the storage media and the data file for which the replacement data was requested. The log module 24 transmits a logging complete signal to the controller 16 after the replacement data with the identifier information is suitably stored in its memory in step 114.

In step 116, the controller 16, following receipt of the logging complete signal, begins playback of the data file. The controller 16 transmits a control signal to the reader 22 instructing the reader 22 to begin reading the data file from the beginning, in other words, the first memory location, of the file and transmitting the data being read to the controller 16. In addition, the controller 16 transmits to the log module 24 the memory locations for the replacement data for the data file to be played, along with information identifying the memory locations of the data packets of the data file as they are played by the controller 16. The log module 24 retrieves the replacement data from its memory and forwards the replacement data to the controller 16 in sufficient time for the controller 16 to use the replacement data when playing the data file, such that playback of the content of the data file occurs as if the data file does not include any unreadable data. The log module 24 performs processing, based on the memory locations for the replacement data, to identify at what times during playback of the data file by the controller 16 should the replacement data be retrieved from memory of the log module 24 and then transmitted to the controller 16, such that playback of the data file occurs as if the data file on the DVD does not include any unreadable data. The module 24 determines a lead time for retrieving the replacement data in relation to playback of the data file, where the lead time is a function of the amount and type of data to be retrieved. For example, a longer lead time is required for data packets containing high definition video data, as compared to the lead time required for data packets only containing audio data.

In one embodiment, the log module 24 monitors playback of the data file by the controller 16 and suitably streams replacement data to the controller 16 so that the appropriate data packet of the replacement data is available for use during playback of the data file when the portion of the data file containing the corresponding unreadable data is encountered during playback.

In another embodiment, the controller 16 retrieves the replacement data directly from the log module 24 as needed to maintain uninterrupted playback of the data file, such as a song or movie.

In a further embodiment of the process 100, the storage media 28 contains the data file for playback by the controller 16.

In a further embodiment, the storage reader 22 has data writing capabilities and writes the replacement data onto the permanent storage media 28, such that the data file no longer contains unreadable data, and preferably so that the data file is stored on the media 28 in the manner originally intended.

Further in such embodiment, the log module 24 does not store in its memory any data identifying the data file for the storage media 28 as having corresponding replacement data.

FIG. 3 shows an exemplary process 130 for playing a data file of a storage media using replacement data corresponding to unreadable data of the data file, after the player 12 has played the data file at least once, for example, in accordance with the steps of the exemplary process 100 described above. For purposes of illustration, the process 130 is described in connection with operations performed by components of the media player 12 and the server 14 of the system 10, as shown in FIG. 1, where the player 12 already has played the DVD with replacement data, in accordance with the process 100 as described above, and where the DVD, following removal from the port 26, again has been inserted into the media port 26 for playback of the data file stored thereon.

Referring to FIG. 3, in step 132 the same operations as described above for step 102 of the process 100 are performed. In addition, the reader 22 transmits to the controller 16 the disc identifier information for the DVD and also the identifier of the data file on the DVD. The controller 16, in turn, transmits a retrieval request to the log module 24. The log module 24, in response to the retrieval request, retrieves from its memory the memory locations corresponding to the replacement data for the data file on the DVD in the port 26 and provides such information to the controller 16.

In step 134, the reader 22 performs operations similar to those described in connection with step 106 of the process 100 above and identifies the memory locations corresponding to unreadable data of the data file. Steps 132 and 134 preferably are performed simultaneously to reduce processing time before the player 12 plays the data file. When step 134 is completed, the reader 22 transmits to the controller 16 all of the memory locations corresponding to unreadable data on the data file.

After step 134, in step 136 the controller 16 determines if any of the memory locations of the unreadable data for the data file do not match the memory locations for the replacement data for the data file retrieved from the log module 24 in step 132. If no, in step 137 the player 12 proceeds to playback the data file as described above for step 116 of the process 100. If yes, then steps 108, 110, 112, 114 and 116 of the process 100 as described above are performed in sequence in step 138 of the process 130, except that steps 108 and 110 are modified as follows. In step 108, the request for replacement data includes only the memory locations of the data packets that do not already have corresponding replacement data stored in the log module 24. In addition, in step 110, the log module 46 in the server 14 creates a correction record of how many times additional replacement data is requested for a data file of a particular storage media, and also for the particular storage media itself.

In a further aspect of the invention, the media player 12 does not include the log module 24 and the server 14 transmits replacement data as streaming data. FIG. 4 shows an exemplary process 150 for playing a data file of a storage media using replacement data corresponding to unreadable data in the data file, where the server 14 streams replacement data to the player 12 and the replacement data is available for use by the controller 16 of the player 12 during playback of the data file, such that playback of the data file occurs as if the data file does not include unreadable data. Referring to FIG. 4, in step 152 of the process 150 the operations described above for steps 102, 104 and 106 of the process 100 are initially performed. Then, similar to step 108 of the process 100, the controller 16 provides for transmission of a request for replacement data to the server 14, except that the request includes instructions that the replacement data be streamed to the player 12.

Then, in step 154 the server 14 confirms the authenticity of the storage media, and the log module 46 stores a correction record of request-related information as in step 110 of the process 100. Following step 154, in step 156 the controller 40 transmits a queue control signal to the archival module 48. The module 48, upon receipt of the queue signal, identifies the memory locations of the data packets to be transmitted as the replacement data, and establishes a queue of the memory locations for the corresponding replacement data in sequence order. After the queue is established, the controller 40, via the module 44, transmits a queue ready signal to the player 12 over the communications network 54. The controller 40 then awaits receipt of a request for streaming replacement data from the player 12.

In step 158, the controller 16 in the player 12, following receipt of the queue ready signal from the server 14, processes the data read from the data file to determine when streaming of replacement data corresponding to the memory locations of unreadable data in the data file should begin, so as to ensure that the player 12 plays the data file as if the data file does not contain unreadable data. In one embodiment, the controller 16 computes lead times for transmitting respective requests for streaming replacement data to the server 14 during the course of playback of the entire data file. The lead time for replacement data is a time interval preceding the expected time that the player 12 would, during playback of the data file, play the portion of the data file corresponding to the replacement data being requested. In one embodiment, the lead time is computed as a function of the expected bandwidth availability of the network 54, expected processing times at the player 12 and 14 and the expected bandwidth of the replacement data to be transmitted. After the computations of the lead times for the respective streaming replacement data to be requested are completed, the controller 16 begins playing the data file from the storage media and the player 22, as needed, transmits to the server 14 a request for streaming replacement data corresponding to the memory location for the next unreadable data portion in the data file.

Following receipt of a request for streaming replacement data, in step 160 the controller 40 of the server 14 streams over the communications network 54 the replacement data corresponding to the request for streaming replacement data. The request, for example, may require the streaming of replacement data containing 10 MB of content which spans many consecutive data packets of the data file.

Then, at step 162, the controller 16, which is continuously playing the data file, uses the streaming replacement data, as suitable, storing it temporarily in its memory as needed, to play the data file as if the data file does not contain unreadable data. In step 164, which is performed simultaneously with step 162, if the controller 16 determines that additional replacement data needs to be streamed as playback continues, the process 150 proceeds to step 158, where a request for streaming of replacement data corresponding to the next unreadable data portion in the data file is transmitted. If no, the player 12 continues playback of the data file as conventional in the art.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for error correction of a data file on a storage media comprising:
   receiving at a media server, over a communications network, a request to replace unreadable data of a data file stored on a storage media and identified during at least one of playback and execution of the data file from the storage media by a reproduction apparatus;
   transmitting to the reproduction apparatus, over the communications network, replacement data corresponding to the unreadable data, responsive to the request; and
   generating, by the media server, a correction record for the storage media, based on the request, in a replacement data request log, wherein the correction record includes information indicating: (i) an identity of a particular storage media, for which replacement data corresponding to unreadable data of a particular data file stored thereon is transmitted responsive to a request to replace unreadable data of the particular data file stored on the particular storage media received at the media server including an identifier of the particular data file and an identifier of the particular storage media; (ii) a number of times a request to replace unreadable data of the particular data file on the particular storage media is received at the media server; and (iii) one or more certain types of storage media, for which replacement data corresponding to unreadable data of the particular data file is transmitted responsive to a request to replace unreadable data of the particular data file, such that a problem with writing a properly received data file to a specific type of storage media is identifiable.

2. The method of claim 1, wherein the request identifies at least one memory location of the data file corresponding to the unreadable data.

3. The method of claim 1, wherein the transmitting of the replacement data further comprises at least one of downloading and streaming the replacement data.

4. The method of claim 1, wherein the correction record includes a memory location corresponding to the unreadable data of the data file.

5. The method of claim 1, wherein the data file includes at least one of content and an executable software application and the storage media is a portable storage media or a permanent storage media.

6. A server for providing replacement data for a data file comprising:
   an archival memory containing at least one data file; and
   a controller coupled to the archival memory and for receiving, over a communications network from a reproduction apparatus, a request for replacement data corresponding to a data packet of the data file contained in the archival memory, wherein the request is based on at least one of playback and execution of the data file from a storage media by the reproduction apparatus and includes a memory location corresponding to the data packet, wherein the controller, in response to the request, transmits over the communications network replacement data corresponding to the memory location in the data file, and wherein the controller generates a correction record for the storage media, based on the request, in a replacement data request log, wherein the correction record includes information indicating: (i) an identity of a particular storage media, for which replacement data corresponding to unreadable data of a particular data file stored thereon is transmitted responsive to a request to replace unreadable data of the particular data file stored on the particular storage media received at the controller including an identifier of the particular data file and an identifier of the particular storage media; (ii) a number of times a request to replace unreadable data of the particular data file on the particular storage media is received at the server; and (iii) one or more certain types of storage media, for which replacement data corresponding to unreadable data of the particular data file is transmitted responsive to a request to replace unreadable data of the particular data file, such that a problem with writing a properly received data file to a specific type of storage media is identifiable.

7. The server of claim 6, wherein the controller transmits the replacement data for download.

8. The server of claim 6, wherein the controller transmits the replacement data in streaming form.

9. The server of claim 6, wherein the controller stores in a memory the correction record, wherein the correction record includes the memory location of the replacement data in the data file.

* * * * *